(12) United States Patent
Kurosaki

(10) Patent No.: US 8,721,087 B2
(45) Date of Patent: May 13, 2014

(54) LIGHT SOURCE DEVICE AND PROJECTOR

(75) Inventor: Hideyuki Kurosaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 113 days.

(21) Appl. No.: 13/435,982

(22) Filed: Mar. 30, 2012

(65) Prior Publication Data

US 2012/0249972 A1 Oct. 4, 2012

(30) Foreign Application Priority Data

Mar. 31, 2011 (JP) ................................. 2011-079371

(51) Int. Cl.
*G03B 21/00* (2006.01)

(52) U.S. Cl.
USPC ................... 353/31; 353/30; 353/34; 353/37; 353/38; 353/98; 362/294; 362/373

(58) Field of Classification Search
USPC ........ 353/30, 31, 34, 37, 38, 94, 98; 362/294, 362/373, 547, 574; 349/5, 7–9
See application file for complete search history.

(56) References Cited

U.S. PATENT DOCUMENTS

| | | | |
|---|---|---|---|
| 5,649,753 A | 7/1997 | Masumoto | |
| 8,089,207 B2 * | 1/2012 | Ramer et al. | 313/501 |
| 8,388,152 B2 * | 3/2013 | Lee et al. | 353/122 |
| 8,469,520 B2 * | 6/2013 | Maeda | 353/31 |
| 8,485,669 B2 * | 7/2013 | Katou et al. | 353/31 |
| 2005/0270775 A1 | 12/2005 | Harbers et al. | |
| 2010/0103660 A1 * | 4/2010 | van de Ven et al. | 362/231 |
| 2010/0328632 A1 | 12/2010 | Kurosaki et al. | |

FOREIGN PATENT DOCUMENTS

| | | |
|---|---|---|
| EP | 0 683 425 A1 | 11/1995 |
| EP | 1 403 695 A1 | 3/2004 |
| EP | 1 605 199 A2 | 12/2005 |
| JP | 2011-013313 A | 1/2011 |

OTHER PUBLICATIONS

Extended European Search Report (EESR) dated Aug. 10, 2012 (in English) in counterpart European Application No. 12162313.6.

* cited by examiner

*Primary Examiner* — Sultan Chowdhury
(74) *Attorney, Agent, or Firm* — Holtz, Holtz, Goodman & Chick, PC

(57) ABSTRACT

A light source device includes: light sources arranged in a plane; collimator lenses disposed in the vicinities of corresponding each of the light sources, each of the collimator lenses collimating a light beam emitted from the corresponding light source, and a holder that holds the light sources and the collimator lenses. The holder holds the light sources and the collimator lenses so that optical axes of the collimator lenses are respectively shifted parallel to optical axes of the light sources by shift lengths that are set so that light beams emitted from the light sources via the collimator lenses are focused on a certain region of an illumination subject body. The light beams emitted from the light sources are refracted by the collimator lenses and focused on the certain region.

18 Claims, 12 Drawing Sheets

LIGHT SOURCE DEVICE AND PROJECTOR

CROSS-REFERENCE TO RELATED APPLICATION(S)

This application is based upon and claims the benefit of priority under 35 USC 119 of Japanese Patent Application No. 2011-079371 filed on Mar. 31, 2011, the entire disclosure of which, including the description, claims, drawings, and abstract, is incorporated herein by reference in its entirety.

FIELD

One or more embodiments of the present invention relate to a light source device and a projector.

BACKGROUND

Nowadays, data projectors as image projection apparatus which project, for example, a picture generated by a personal computer, a video image, and an image of image data stored in a memory card or the like onto a screen are in common use. In such projectors, light emitted from a light source is focused on a micromirror display element called a digital micromirror device (DMD) or a liquid crystal panel, whereby a color image is displayed on a screen.

Such projectors mainly employ a high-luminance discharge lamp as a light source. However, in recent years, a wide variety of projectors which employ light-emitting diodes, laser diodes, or organic EL devices, phosphors, etc. as light sources have been developed.

Incidentally, JP-A-2011-13313 (FIG. 5) discloses a projector which is equipped with plural laser light sources and collimator lenses corresponding to the respective laser light sources and in which excitation light beams that have been emitted from the laser light sources and passed through the collimator lenses are applied to respective phosphor layers of a phosphor wheel via a convex lens as a condenser lens, whereby fluorescent light beams are emitted from the phosphor layers.

However, in the configuration of the projector disclosed in JP-A-2011-13313, if the number of laser light sources and collimator lenses is increased and arranged two-dimensionally, that is, in rows and columns, to attain high luminance, a relatively large condenser lens becomes necessary. Thus, manufacturing costs and the size of a projector cabinet may increase.

SUMMARY

One or more embodiments of the present invention have been made in view of the above, and an object of the embodiments is therefore to provide a high-luminance light source device which is simple in structure and low in manufacturing cost, as well as a projector having such a light source device.

A light source device includes: plural light sources arranged in a plane; plural collimator lenses disposed in the vicinities of corresponding each of the light sources, each of the collimator lenses collimating a light beam emitted from the corresponding light source; and a holder that holds the light sources and the collimator lenses. The holder holds the light sources and the collimator lenses so that optical axes of the collimator lenses are respectively shifted parallel to optical axes of the light sources by shift lengths that are set so that light beams emitted from the light sources via the collimator lenses are focused on a certain region of an illumination subject body. The light beams emitted from the light sources are refracted by the collimator lenses and focused on the certain region.

A projector includes: a red light source device; a green light source device; a blue light source device; a guiding optical system that causes light beams emitted from each of the red light source device, the green light source device, and the blue light source device to travel along the same optical axis; a display element; a light-source-side optical system that guides the light beams having the same optical axis to the display element; a projection-side optical system that projects an optical image formed by the display device onto a screen; and a projector controller that controls the light source devices and the display element. At least one of the red light source device, the green light source device, and the blue light source device comprises the light source device. The light source device includes a phosphor plate and light sources that emit excitation light beams. The excitation light beams are emitted via the collimator lenses to the phosphor plate.

According to the embodiments, it is possible to provide a high-luminance light source device which is simple in structure and low in manufacturing cost, as well as a projector having such a light source device.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Figure 1:
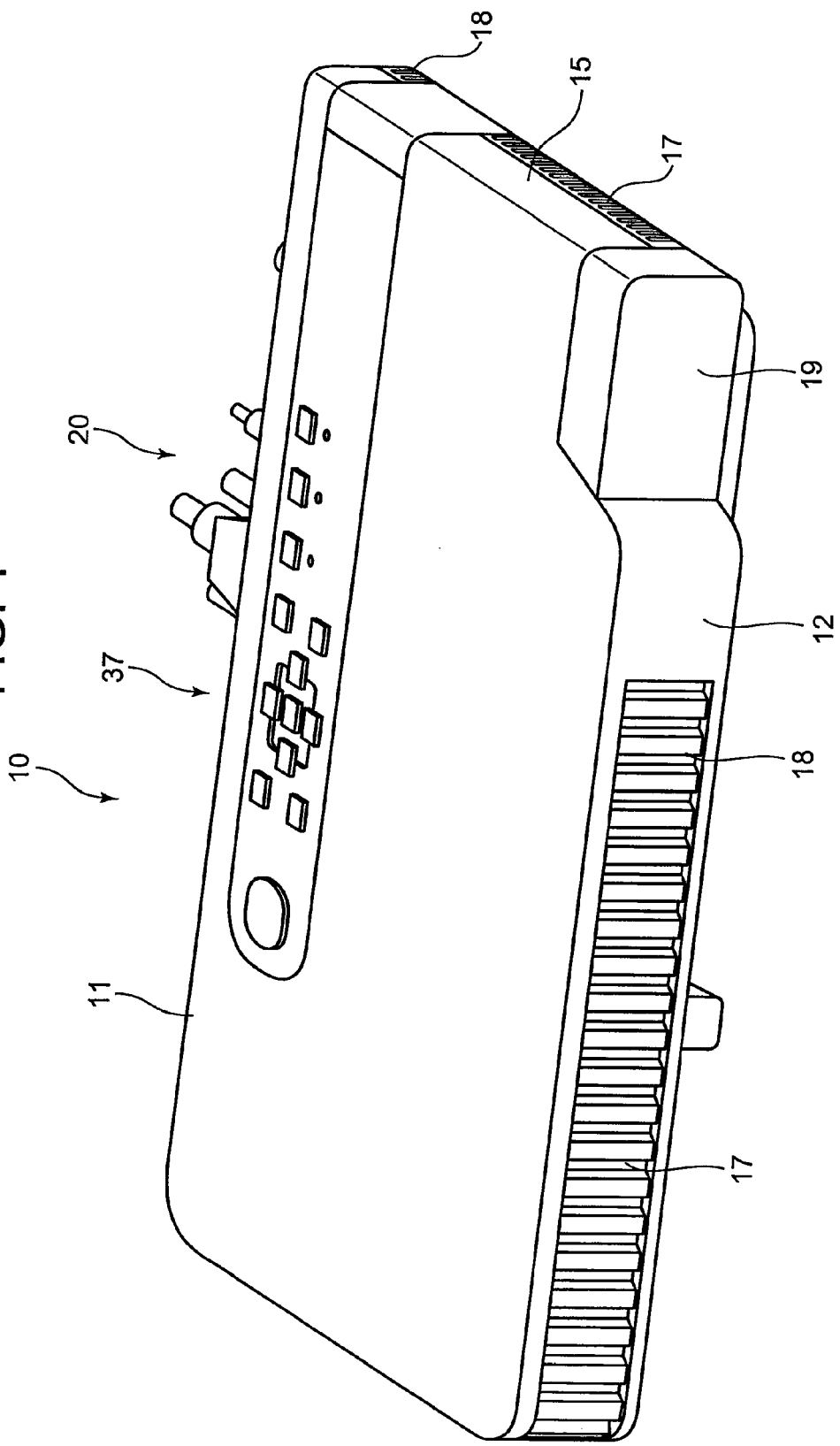
FIG. 1 is a perspective view showing an appearance of a projector according to an embodiment of the present invention.

One or more embodiments of the present invention will be described below. FIG. 1 is a perspective view showing an appearance of a projector 10. In the embodiment, the right side and the left side of the projector 10 are defined as those with respect to a projection direction, and the front side and the rear side are defined with respect to a direction toward the screen side and the ongoing direction of light beams.

As shown in FIG. 1, the projector 10 is generally shaped like a rectangular parallelepiped and has a lens cover 19 which is located beside a front panel 12 (side panel) of a projector cabinet and serves to cover a projection opening. Plural air inlets 18 are formed through the front panel 12. The projector 10 is provided with an Ir receiver (not shown) for receiving a control signal transmitted from a remote controller.

A top panel 11 of the cabinet is provided with a key/indicator unit 37. Keys and indicators such as a power switch, a power indicator indicating whether the power is on or off, a projection switch for projection on/off switching, and an overheat indicator for notifying a user of overheat of a light source unit, a display element, a control circuit, or the like are arranged in the key/indicator unit 37.

The rear panel of the cabinet is provided with and various terminals 20 such as a power adaptor plug and input/output connectors including a USB terminal and a D-SUB terminal, an S terminal, an RCA terminal, etc. for input of a video signal. Plural air inlets are formed through the rear panel. Plural air outlets 17 are formed through each of a right side panel (not shown) and a left side panel 15 of the cabinet. Air inlets 18 are also formed through the left side panel 15 at a position that is close to the rear panel. Plural air inlets or outlets are formed through the bottom panel (not shown) at each of positions close to the front panel 12, the rear panel, the left side panel 15, and the right side panel.

Figure 2:
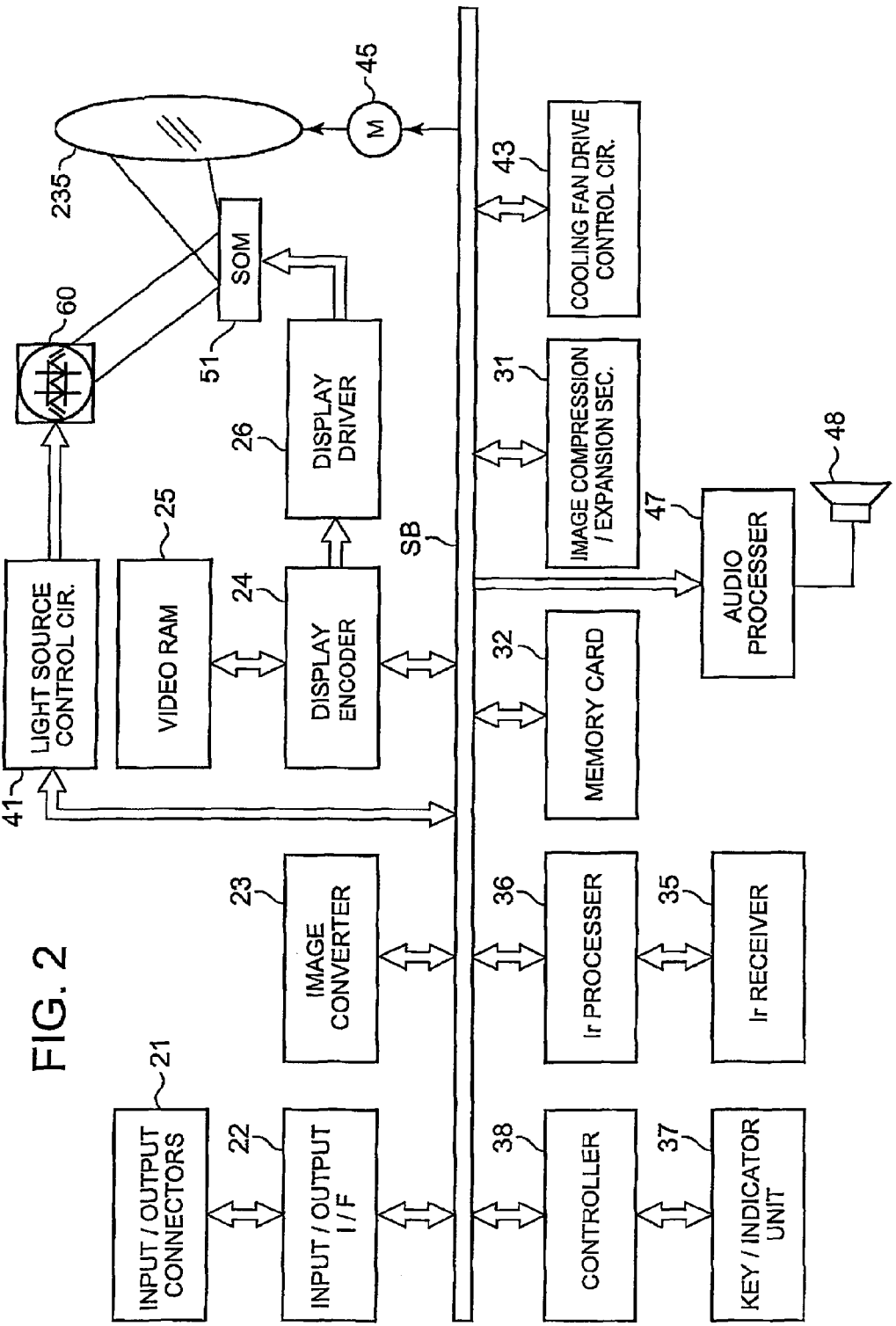
FIG. 2 is a block diagram showing functions and circuits of the projector according to the embodiment of the invention.

Next, a projector controller of the projector 10 will be described with reference to a block diagram of FIG. 2. The projector controller is configured of a controller 38, an input/output interface 22, an image conversion section 23, a display encoder 24, a display driver 26, etc. An image signal that complies with one of various standards that is input from an input/output connector 21 is supplied via the input/output interface 22 and a system bus (SB) to the image conversion section 23, where it is converted into an image signal having a prescribed format that is suitable for display so as to be unified. The image signal is output to the display encoder 24.

The display encoder 24 develops the received image signal in a video RAM 25 and has the received image signal stored therein, and generates a video signal based on the information stored in the video RAM 25. The display encoder 24 outputs the generated video signal to the display driver 26.

The display driver 26, which functions as a display element control means, drives a display element 51 which is a spatial optical modulator (SOM) at a proper frame rate based on the image signal received from the display encoder 24. Light beams emitted from a light source unit 60 are applied to the display element 51 via a guiding optical system, whereby an optical image is formed by light reflected from the display element 51. The optical image is projected (displayed) onto a screen (not shown) via a projection-side optical system (described later). A movable lens group 235 of the projection-side optical system is driven by a lens motor 45 for zoom adjustment and focus adjustment.

An image compression/expansion section 31 performs recording processing, that is, converts a luminance signal and a color difference signal of an image signal into compressed data through such processing as ADCT and Huffman coding and sequentially writes the compressed data to a memory card 32 which is a detachable recording medium. In a reproduction mode, the image compression/expansion section 31 performs processing for enabling, for example, moving image display based on the image data stored in the memory card 32. That is, the image compression/expansion section 31 reads the image data from the memory card 32, expands individual image data constituting a moving image on a frame-by-frame basis, and outputs the expanded image data to the display encoder 24 via the image conversion section 23.

The controller 38 which controls operations of the individual circuits provided in the projector 10 is configured of a CPU, a ROM which is stored with operation programs for various kinds of setting and other purposes in a fixed manner, a RAM which is used as a work memory, and other components.

A manipulation signal generated by the key/indicator unit 37 which is provided on the top panel 11 of the cabinet and consists of main keys, indicators, etc. is directly supplied to the controller 38. A key manipulation signal transmitted from the remote controller is received by the Ir receiver 35 and demodulated by an Ir processor 36 into a code signal, which is output to the controller 38.

An audio processor 47 is connected to the controller 38 by the system bus (SB). Equipped with sound source circuits for a PCM sound source etc., the audio processor 47 converts audio data into an analog signal and thereby causes output of a loud sound by driving a speaker 48 in a projection mode or a reproduction mode.

The controller 38 controls a light source control circuit 41 which is a light source control means. The light source control circuit 41 individually controls light emissions of an excitation light illumination device, a red light source device, and a blue light source device of the light source unit 60 so that the light source unit 60 emits light beams in prescribed wavelength ranges that are necessary during image generation.

Furthermore, the controller 38 causes a cooling fan drive control circuit 43 to detect temperatures using plural temperature sensors provided in the light source unit 60 etc. and to control the rotation speed of cooling fans according to temperature detection results. The controller 38 causes the cooling fan drive control circuit 43 to keep the cooling fans rotating even after power-off of the projector main body using a timer or the like. The controller 38 also performs, for example, a control of powering off the projector main body depending on temperature detection results.

Figure 3:
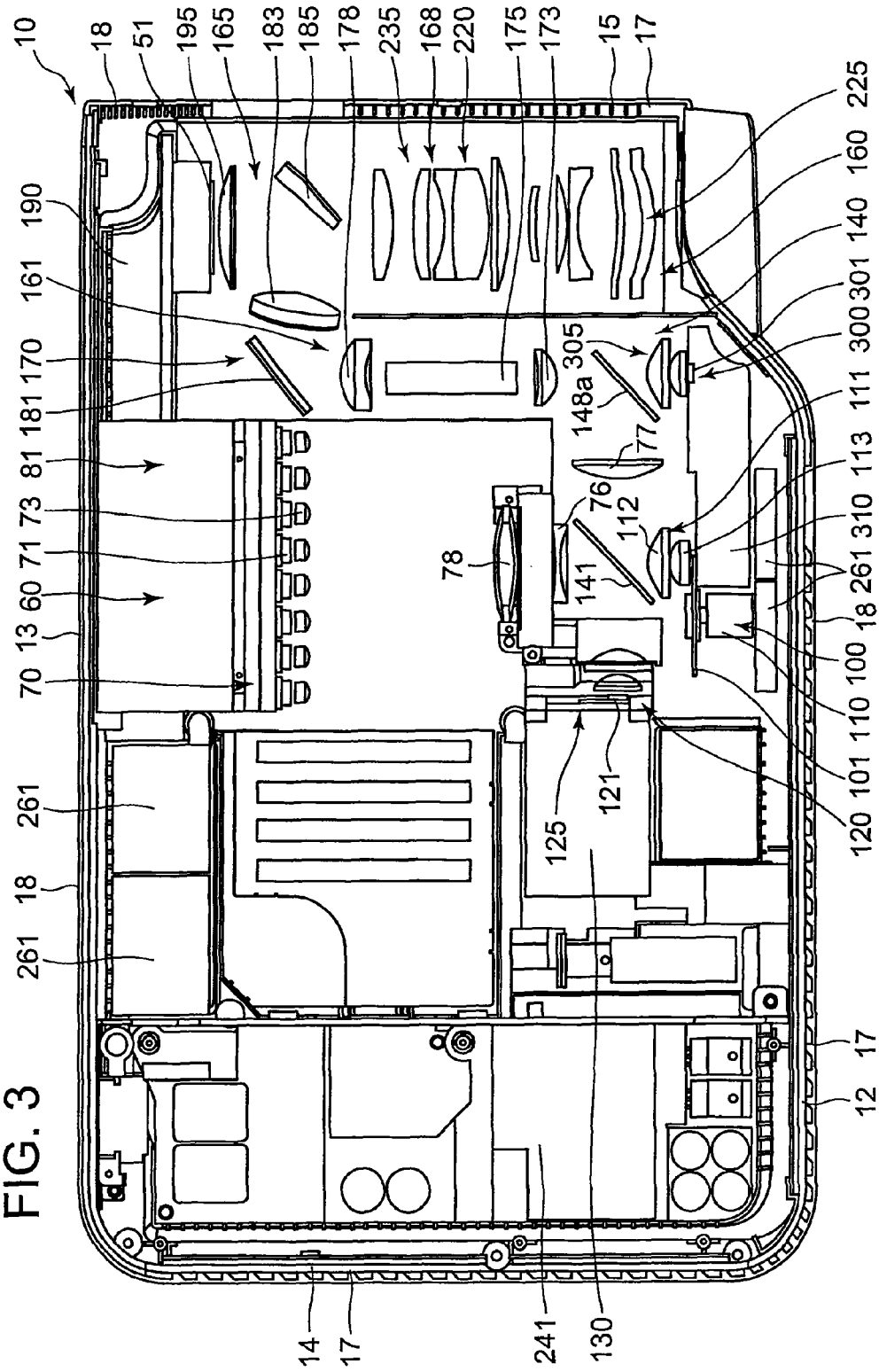
FIG. 3 is a schematic plan view showing the internal structure of the projector according to the embodiment of the invention.
Figure 4:
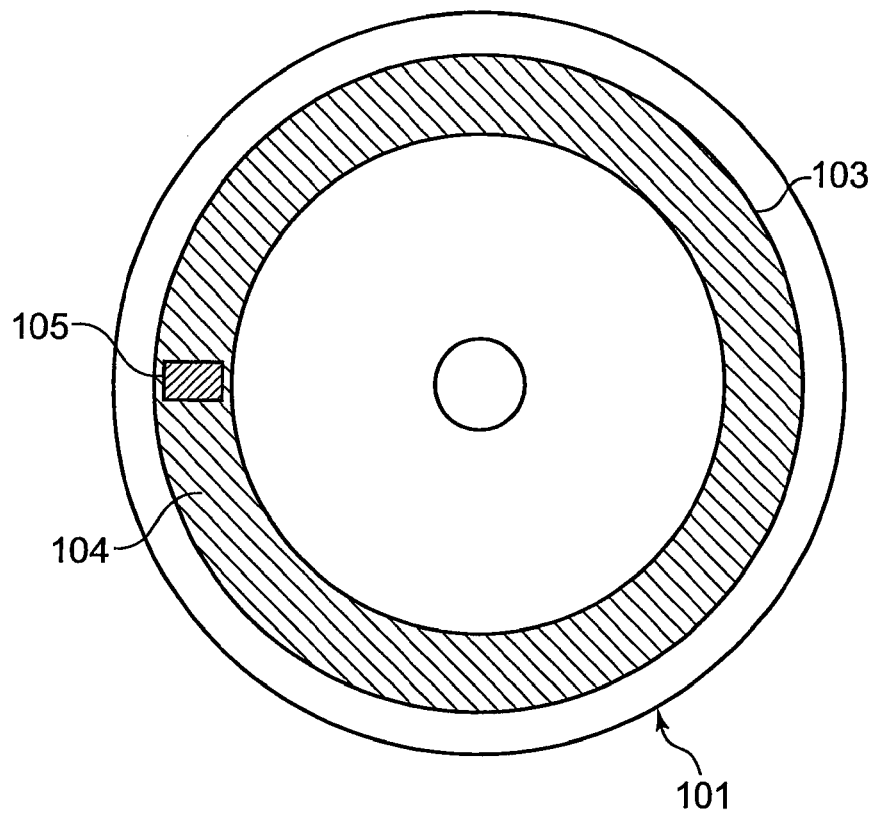
FIG. 4 is a schematic front view of a phosphor wheel (phosphor plate) of the projector according to the embodiment of the invention.
Figure 5:
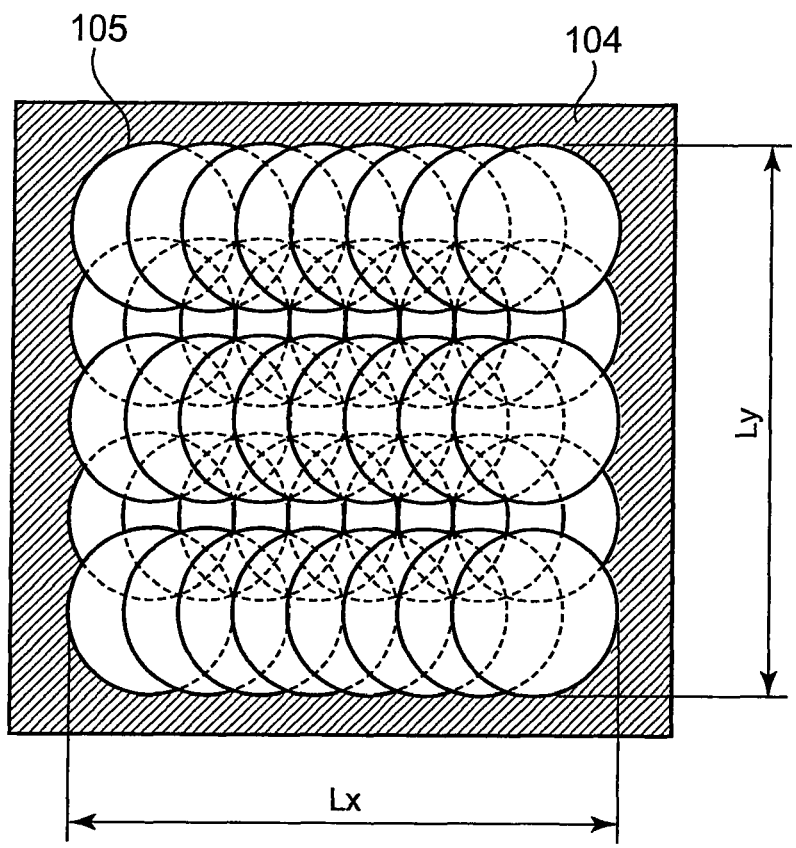
FIG. 5 illustrates a region, to be illuminated by excitation light beams, on the phosphor wheel of the projector according to the embodiment of the invention.

Next, the internal structure of the projector 10 will be described. FIG. 3 is a schematic plan view showing the internal structure of the projector 10. FIG. 4 is a schematic front view of a phosphor wheel (phosphor plate) 101 of the projector 10. FIG. 5 illustrates a region, to be illuminated by excitation light beams, on the phosphor wheel 101 of the projector 10.

As shown in FIG. 3, in the projector 10, a control circuit board 241 is disposed in the vicinity of the right side panel 14. The control circuit board 241 is provided with a power circuit block, a light source control block, etc. The projector 10 is provided with the light source 60 and an optical system unit 160. The light source unit 60 is disposed beside the control circuit board 241, that is, approximately at the center of the projector cabinet in the right-left direction. The optical system unit 160 is disposed between the light source unit 60 and the left side panel 15.

The light source unit 60 is equipped with an excitation light illumination device 70 which is disposed approximately at the center of the projector cabinet in the right-left direction in the vicinity of the rear panel 13, a fluorescent light emitting device 100 which is disposed in the vicinity of the front panel 12 on the optical axis of light beams emitted from the excitation light illumination device 70, a blue light source device 300 which is disposed in the vicinity of the front panel 12 in such a manner that its optical axis is parallel with the light beams emitted from the excitation light illumination device 70, a red light source device 120 disposed between the excitation light illumination device 70 and the blue light source device 300, and a guiding optical system 140 for changing the optical paths of light emitted from the fluorescent light emitting device 100, light emitted from the red light source device 120, and light emitted from the blue light source device 300 so that they come to travel along the same optical axis and then guide them to an incidence surface (prescribed surface) of a light tunnel 175. The excitation light illumination device 70 and the fluorescent light emitting device 100 correspond to the "light source device" or the "green light source device" of the invention.

The excitation light illumination device 70 is equipped with excitation light sources 71, a condenser lens 78 for condensing light beams emitted from the respective excitation light sources 71, and a heat sink 81 disposed between the excitation light sources 71 and the rear panel 13.

The excitation light sources 71 are light-emitting elements which are laser light sources such as blue laser diodes, and are arranged in a matrix of five rows and eight columns. Collimator lenses 73 for converting light beams emitted from the respective excitation light sources 71 into directivity-enhanced light beams are disposed on the optical axes of the respective excitation light sources 71. In the embodiment, the plural collimator lenses 73 output the directivity-enhanced light beams so that their intervals will become shorter than the intervals of the light beams emitted from the excitation light sources 71.

A cooling fan 261 is disposed in the vicinity of the heat sink 81. The excitation light sources 71 are cooled by the cooling fan 261 and the heat sink 81.

The fluorescent light emitting device 100 is equipped with the phosphor wheel 101 (phosphor plate) which is disposed perpendicularly to the optical axis of light beams emitted from the excitation light illumination device 70 and passing through a concave lens 76, a wheel motor 110 for rotationally driving the phosphor wheel 101, and a condenser lens group 111 for condensing a light beam that is emitted from the phosphor wheel 101 toward the rear panel 13. The condenser lens group 111 has a large-diameter convex lens 112 and a small-diameter convex lens 113 which are disposed on a straight line that coincides with the optical axis of the condenser lens 78.

As shown in FIG. 4, the phosphor wheel 101 is a disc-shaped metal base member which is formed with, as a recess 103, an annular fluorescent light emitting area which emits fluorescent light in a green wavelength range when receiving excitation light beams emitted from the excitation light sources 71. Thus, the phosphor wheel 101 functions as a phosphor plate for emitting fluorescent light when receiving excitation light. The excitation-light-sources-71-side surface, including the fluorescent light emitting area, of the phosphor wheel 101 is a reflection surface capable of reflecting light because it is mirror-finished by silver evaporation, for example. A green phosphor layer 104 ("illumination subject body") is formed on this reflection surface. As shown in FIG. 4, in the projector 10 according to the embodiment, a certain region 105 of the phosphor layer 104 of the phosphor wheel 101 is illuminated with excitation light beams coming from the excitation light sources 71. Settings are made so that the certain region 105 has a prescribed shape such as an approximately rectangular shape.

More specifically, as shown in FIG. 5, excitation light beams emitted from the respective excitation light sources 71 and refracted by the respective collimator lenses 73 overlap with each other or completely lie on each other in the certain region 105 of the phosphor layer 104. Settings are made so that excitation light beams have an approximately uniform illumination intensity distribution in the rectangular certain region 105 having a width Lx in the right-left direction and a width Ly in the top-bottom direction (see FIG. 5). As described later, the projector 10 according to the embodiment is equipped with a rectangular DMD (display element 51) and the light tunnel 175 having a rectangular cross section. The certain region 105 which is illuminated with excitation light beams is given a generally rectangular shape so as to have the same shape as the DMD and the light tunnel 175. The shape of the certain region 105 is not limited to a generally rectangular shape and may be an arbitrary shape such as a circle or an ellipse. As described later, the certain region 105 can be formed in the phosphor layer 104 of the phosphor wheel 101 so as to have a desired shape or light intensity distribution by properly adjusting a shift length 701 of the optical axis 73a of each collimator lens 73 from the optical axis 71a of the associated excitation light source 71.

As shown in FIG. 3, light beams that are emitted from the excitation light sources 71 and applied to the green phosphor layer 104 of the phosphor wheel 101 via the collimator lenses 73, the condenser lens 78, the concave lens 76, and a dichroic mirror 141 excite the green phosphor of the green phosphor layer 104. As a result, fluorescent light that is emitted from the green phosphor in all directions goes toward the side of the excitation light sources 71 directly or after being reflected by the reflection surface of the phosphor wheel 101. Excitation light beams that shine on the metal base member without being absorbed by the phosphor of the phosphor layer 104 are reflected by its reflection surface, again enter the phosphor layer 104, and excite the phosphor. In this manner, making the surface of the recess 103 of the phosphor wheel 101 a reflection surface makes it possible to increase the efficiency of utilization of excitation light beams emitted from the excitation light sources 71 and allows the phosphor to emit light having higher intensity. The concave lens 76 converts the excitation light beams emitted from the excitation light sources 71 into generally parallel light beams.

Whereas excitation light beams that are reflected by the reflection surface of the phosphor wheel 101 to the side of the phosphor layer 104 and output without being absorbed by the phosphor pass through the first dichroic mirror 141, and fluorescent light is reflected by the first dichroic mirror 141. Therefore, no excitation light beams are output from the projector 10. The dichroic mirror 141 is disposed obliquely with respect to the optical axis of the concave lens 76 and the condenser lens group 111, and transmits excitation light beams that are output from the concave lens 76 whereas reflecting fluorescent light condensed by the condenser lens group 111. A cooling fan 261 is disposed between the wheel motor 110 and the front panel 12 and cools the phosphor wheel 101.

The red light source device 120 is equipped with a red light source 121 which is disposed in such a manner that its optical axis is perpendicular to the optical axis of the excitation light sources 71 and a condenser lens group 125 for condensing light emitted from the red light source 121. The red light source device 120 is disposed in such a manner that its optical axis is perpendicular to the optical axes of light beams emitted from the excitation light illumination device 70 and light in a green wavelength range emitted from the phosphor wheel 101. The red light source 121 is a red light-emitting diode which is a semiconductor light-emitting element for emitting light in a red wavelength range. The red light source device 120 is also equipped with a heat sink 130 which is disposed on the right side panel 14 side of the red light source 121. A cooling fan 261 is disposed between the heat sink 130 and the front panel 12 and cools the red light source 121.

The blue light source device 300 is equipped with a blue light source 301 which is disposed in such a manner that its optical axis is parallel with that of the fluorescent light emitting device 100 and a condenser lens group 305 for condensing light emitted from the blue light source 301. The blue light source device 300 is disposed in such a manner that its optical axis crosses the optical axis of light emitted from the red light source device 120. The blue light source 301 is a blue lightemitting diode which is a semiconductor light-emitting element for emitting light in a blue wavelength range. The blue light source device 300 is also equipped with a heat sink 310 which is disposed on the front panel 12 side of the blue light source 301. A cooling fan 261 is disposed between the heat sink 310 and the front panel 12 and cools the blue light source 301.

The guiding optical system 140 consists of condenser lenses for condensing light beams in red, green, and blue wavelength ranges, dichroic mirrors for changing the optical paths of light beams in respective wavelength ranges so that they come to travel along the same optical axis, and other components. More specifically, the first dichroic mirror 141 which transmits light in a blue wavelength range and light in a red wavelength range and reflects light in a green wavelength range to change its optical path by 90° so that it comes to travel toward the left side panel 15 is disposed at the position where the optical axis of light beams in a blue wavelength range emitted from the excitation light illumination device 70 and light in a green wavelength range emitted from the phosphor wheel 101 crosses the optical axis of light in a red wavelength range emitted from the red light source device 120.

A second dichroic mirror 148 which transmits light in a blue wavelength range and reflects light in a green wavelength range and light in a red wavelength range by 90° so that they come to travel toward the rear panel 13 is disposed at the position where the optical axis of light in a blue wavelength range emitted from the blue light source device 300 crosses the light in the red wavelength range emitted from the red light source device 120. A convex condenser lens 77 is disposed between the first dichroic mirror 141 and the second dichroic mirror 148. A condenser lens 173 for condensing light beams originating from the light sources on the incidence surface of the light tunnel 175 is disposed in the vicinity of the light tunnel 175.

The optical system unit 160, which has a generally U-shaped optical path, is configured of three blocks, that is, an illumination-side block 161 disposed on the left of the excitation light illumination device 70, an image generation block 165 disposed in the vicinity of the intersecting position of the rear panel 13 and the left side panel 15, and a projection-side block 168 disposed between the guiding optical system 140 and the and the left side panel 15.

The illumination-side block 161 has part of a light-sourceside optical system 170 for guiding light source light originating from the light source unit 60 to the display element 51 of the image generation block 165. That part of the lightsource-side optical system 170 which belongs to the illumination-side block 161 has the light tunnel 175 for converting light source light originating from the light source unit 60 into a light beam having a uniform intensity distribution, the condenser lens 178 for condensing light that is output from the light tunnel 175, an optical path changing mirror 181 for changing the optical path of the light that is output from the light tunnel 175 so that it comes to travel toward the image generation block 165, and other elements.

The image generation block 165 has, as part of the lightsource-side optical system 170, a condenser lens 183 for condensing light source light reflected by the optical path changing mirror 181 on the display element 51 and an illumination mirror 185 for applying light transmitted by the condenser lens 183 to the display element 51. The image generation block 165 is also provided with the display element 51 which is a DMD. A heat sink 190 for cooling the display element 51 is disposed between the display element 51 and the rear panel 13 and cools the display element 51. A condenser lens 195 is disposed immediately in front of the display element as an element of a projection-side optical system 220.

Figure 6:
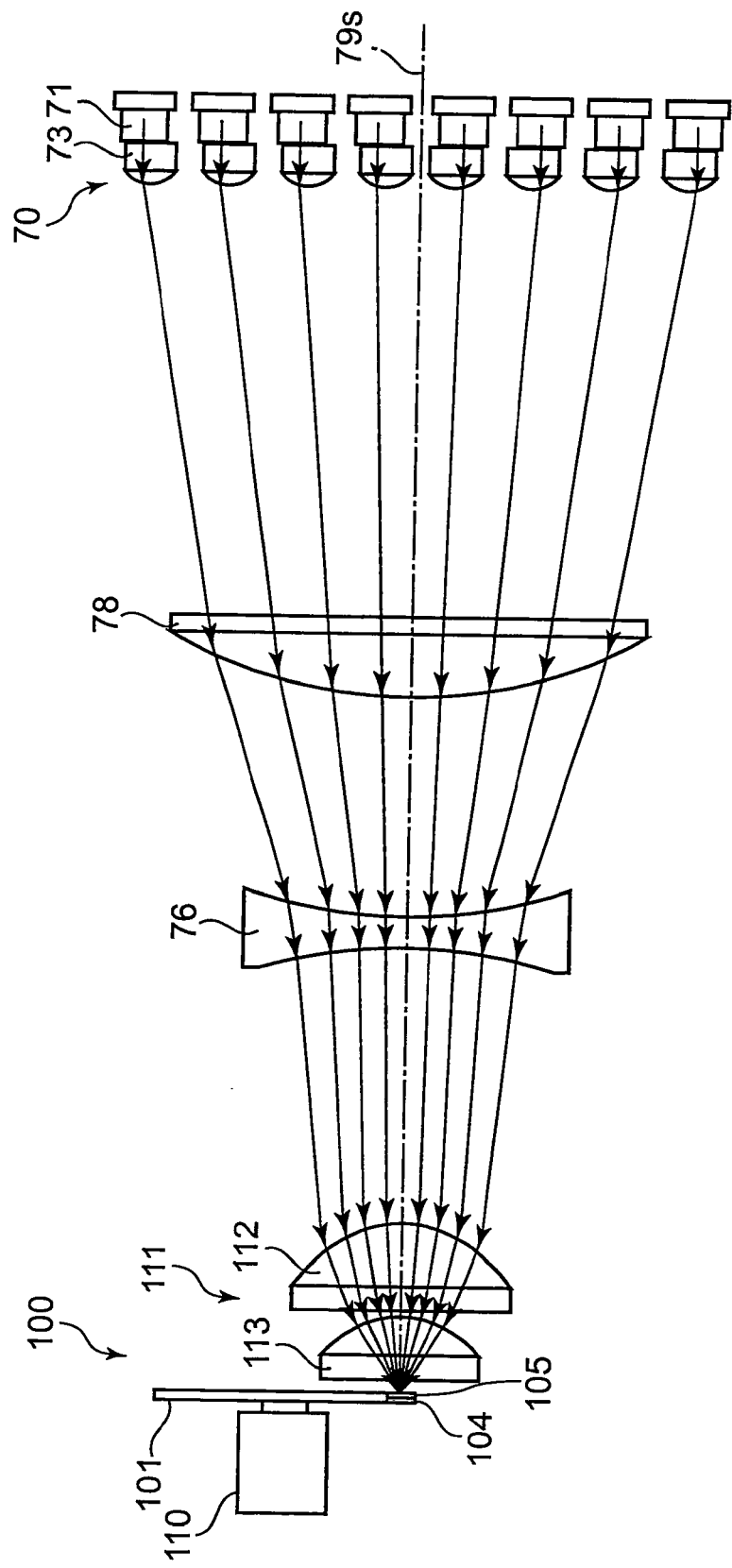
FIG. 6 is a schematic plan view showing optical paths of light beams emitted from an excitation light illumination device (light source device) of the embodiment of the invention.
Figure 7:
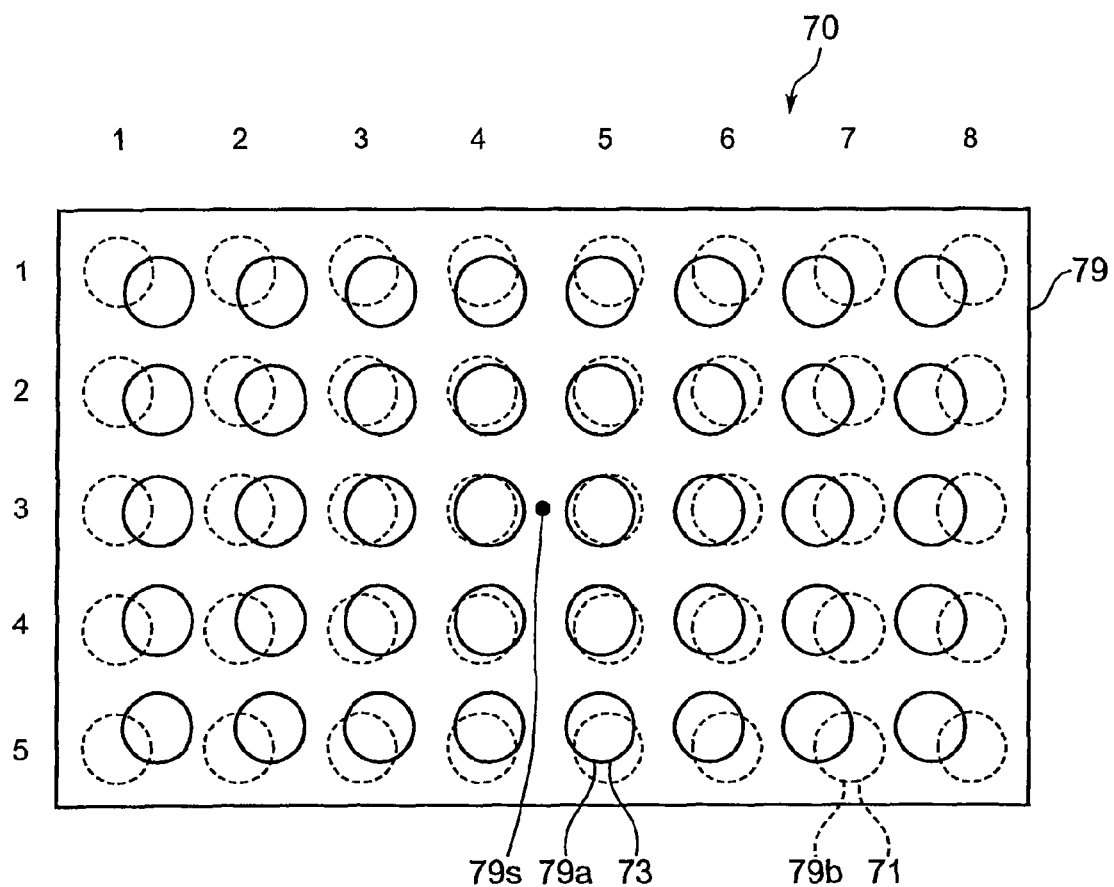
FIG. 7 is a front view of the excitation light illumination device.
Figure 8:
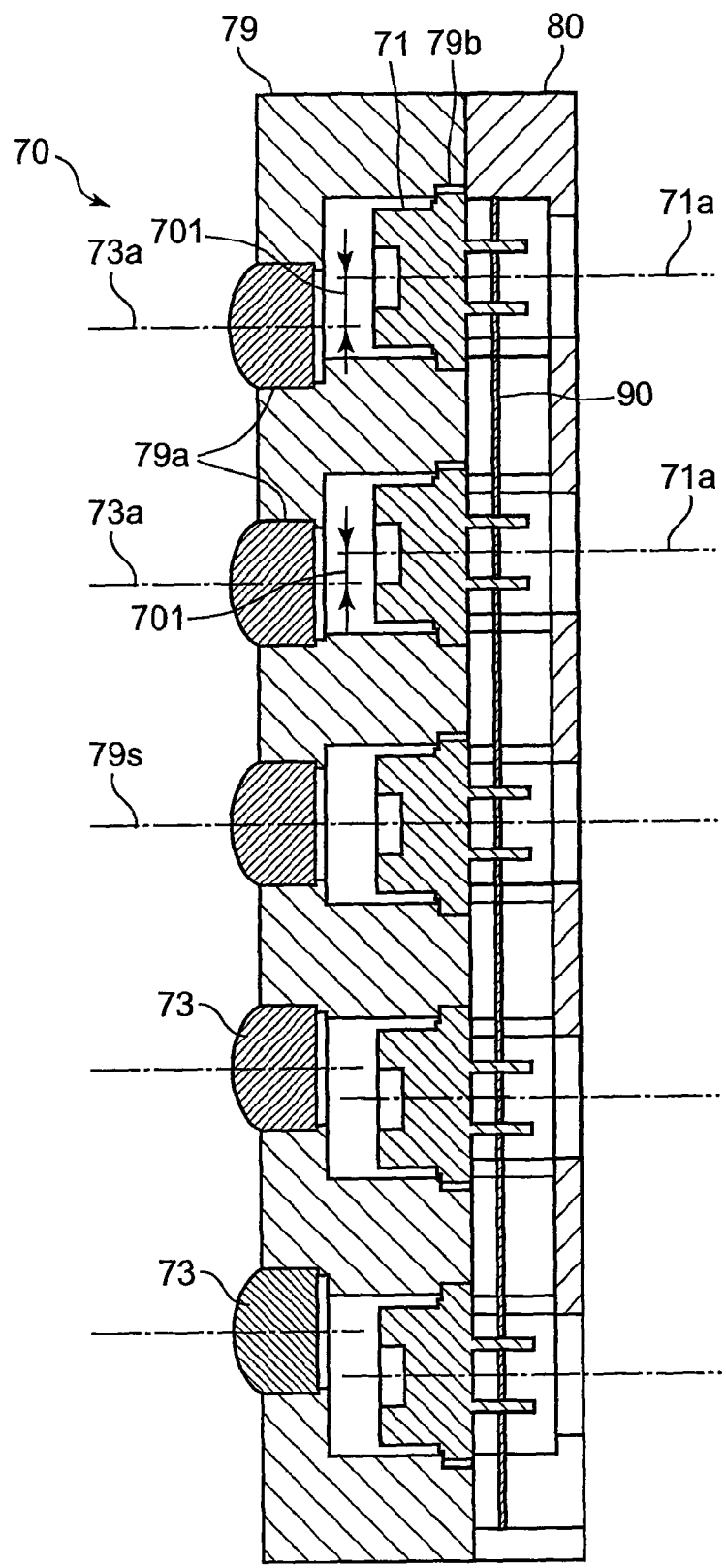
FIG. 8 is a sectional view of the excitation light illumination device.

The projection-side block 168 has a lens group of the projection-side optical system 220 for projecting, onto a screen, on-light that is reflected from the display element 51. The projection-side optical system 220 is a variable focal point lens which consists of a fixed lens group 225 incorporated in a fixed lens barrel and a movable lens group 235 incorporated in a movable lens barrel and thereby has a zoom function. Thus, the projection-side optical system 220 can perform a zoom adjustment and a focal adjustment when the movable lens group 235 is moved by the lens motor 45. Next, the excitation light illumination device 70, the fluorescent light emitting device 100, etc. which are the light source devices of the projector 10 will be described in detail. FIG. 6 is a schematic plan view showing optical paths of light beams emitted from the excitation light illumination device 70 which is the "light source device" of the invention. FIG. 7 is a front view of the excitation light illumination device 70. FIG. 8 is a sectional view of the excitation light illumination device 70. FIGS. 9A to 9D illustrate a shift length of the optical axis 73a of a collimator lens 73 from the optical axis 71a of an excitation light source 71. FIG. 10 illustrates an arrangement region of the excitation light sources 71 and the diameter of the condenser lens 78.

The excitation light illumination device 70 has the plural excitation light sources 71 ("light sources"), the plural collimator lenses 73 which are disposed on the optical axes 71a of the excitation light sources 71, respectively, and enhances directivity of light beams emitted from the excitation light sources 71, and a lens holder 79 and a light source holder 80 ("holder") which hold the collimator lenses 73 and the excitation light sources 71. As shown in FIG. 8 and FIGS. 9A-9D, the lens holder 79 and the light source holder 80 hold the collimator lenses 73 and the excitation light sources 71 so that the optical axes 73a of the collimator lenses 73 are shifted in a parallel manner from the optical axes 71a of the excitation light sources 71, respectively. Shift lengths 701 of the optical axes 73a of the collimator lenses 73 from the optical axes 71a of the excitation light sources 71 are set so that as shown in FIGS. 4 and 5 light beams emitted from the excitation light sources 71 and refracted by the collimator lenses 73 are focused on the certain region 105 of the phosphor layer 104 ("illumination subject body") of the phosphor wheel 101. The light beams emitted from the excitation light sources 71 are refracted by the collimator lenses 73 and focused on the certain region 105 of the phosphor layer 104 of the phosphor wheel 101.

As shown in FIG. 7, the lens holder 79 and the light source holder 80 hold and the excitation light sources 71 and the collimator lenses 73 which correspond to the respective excitation light sources 71 so that the excitation light sources 71 as well as the collimator lenses 73 are arranged in rows and columns in a plane. As shown in FIGS. 7 and 8, the shift length 701 of each collimator lens 73 is determined according to the distance between the associated excitation light source 71 and the center 79s of the region where the excitation light sources 71 are arranged two-dimensionally so that excitation light beams are focused on the certain region 105 of the phosphor layer 104.

The lens holder 79 is a holding member made of a heat-resistant resin, and, as shown in FIGS. 7 and 8, has plural holes 79a as lens holding holes which hold the respective collimator lenses 73 so that they are arranged in rows and columns in a plane and holes 79b as light source holding holes which hold the respective excitation light sources 71 so that they are arranged in rows and columns in a plane.

More specifically, as shown in FIGS. 7 and 8, the holes 79b as the light source holding holes are formed so as to hold the excitation light sources 71 so that they are arranged at regular intervals in rows and columns in a plane. The holes 79a as the lens holding holes are formed so as to hold the collimator lenses 73 which correspond to the respective excitation light sources 71 so that they are shifted from the collimator lenses 73 by the shift lengths 701, respectively. The collimator lenses 73 are disposed in the respective holes 79a and the excitation light sources 71 are disposed in the respective holes 79b of the lens holder 79.

The optical axes 71a of the excitation light sources 71 are made parallel with each other and prescribed intervals are set between the excitation light sources 71 so as to secure spaces for placement of a board for the excitation light sources 71, spaces for the holders 79 and 80 for holding the excitation light sources 71, and wiring spaces and to properly dissipate heat generated by the excitation light sources 71.

The center axes of the holes 79a as the lend holding holes and the holes 79b as the light source holding holes are set parallel with each other so as to be perpendicular to the front end surface of the lens holder 79. Having the holes 79a and 79b formed in this manner, the lens holder 79 can easily be manufactured by charging a resin material into a metal die.

Although in the embodiment the excitation light sources 71 are arranged at regular intervals in rows and columns and the collimator lenses 73 which correspond to the respective excitation light sources 71 are shifted by the prescribed shift lengths 701, the invention is not limited to such a case. For example, a modification is possible in which the collimator lenses 73 are arranged at regular intervals in rows and columns and the excitation light sources 71 which correspond to the respective collimator lenses 73 are shifted by the prescribed shift lengths 701.

The light source holder 80 is made of a heat radiation member such as aluminum and holds the excitation light sources 71. More specifically, as shown in FIG. 8, the light source holder 80 is fitted into or with the lens holder 79 and holds the excitation light sources 71 placed between them. The light source holder 80 and the lens holder 79 are fixed to each other with fixing screws (not shown) into a unified body in a state that they hold the excitation light sources 71.

For example, a flexible board 90 which is electrically connected to the excitation light sources 71 and the controller 38 is disposed behind the light source holder 80. The excitation light sources 71 and the collimator lenses 73 are held by the lens holder 79 and the light source holder 80 in such a manner that the optical axes 73a are parallel with the optical axes 71a and shifted from the latter by the prescribed shift lengths 701.

The shift length 701 of the optical axis 73a of each collimator lens 73 from the optical axis 71a of the associated excitation light source 71 is determined according to the distance between the associated excitation light source 71 and the center 79s of the region where the excitation light sources 71 are arranged two-dimensionally in the holders 79 and 80 (or the optical axis of light beams).

As shown in FIGS. 6-8, the excitation light illumination device 70 according to the embodiment is configured in such a manner that the shift length 701 increases as the distance between the excitation light source 71 and the center 79s of the region where the excitation light sources 71 are arranged two-dimensionally in the lens holder 79 and the light source holder 80 increases.

As shown in FIG. 6, the excitation light illumination device 70 according to the embodiment is configured in such a manner that the center 79s of the region where the excitation light sources 71 are arranged two-dimensionally, the optical axis of excitation light beams emitted from the respective excitation light sources 71, the optical axis of the condenser lens 78, the optical axis of the concave lens 76, the optical axis of the condenser lens group 111, and the center of the certain region 105, to be illuminated with the excitation light beams, of the phosphor layer 104 of the phosphor wheel 101 are located on the same straight line.

As shown in FIG. 10, the excitation light illumination device 70 is configured in such a manner that the diameter of the condenser lens 78 which is disposed between the collimator lenses 73 and the phosphor wheel 101 is shorter than the longer sides of the region where the excitation light sources 71 are arranged two-dimensionally in the lens holder 79 and the light source holder 80. That is, in the embodiment, the diameter of the condenser lens 78 is shorter than in a comparative example in which the diameter of a condenser lens 78s is shorter than the longer sides of the region where the excitation light sources 71 are arranged two-dimensionally in the holders 79 and 80.

Figure 9A:
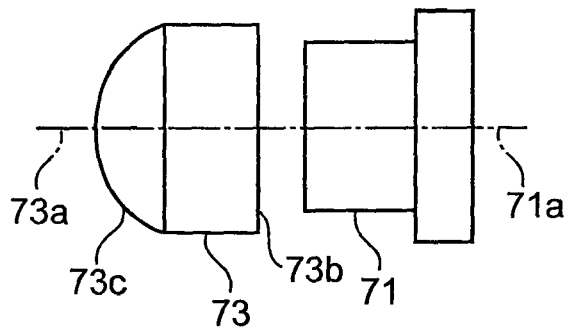
FIGS. 9A to 9D illustrate a shift length of the optical axis of a collimator lens from the optical axis of an excitation light source in the projector according to the embodiment.
Figure 9B:
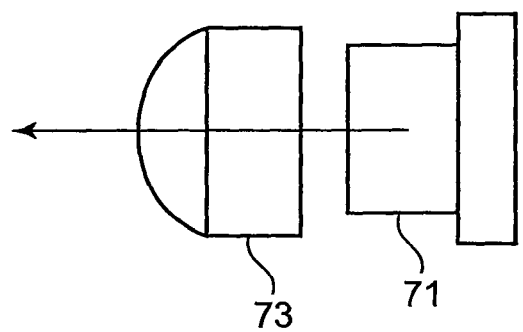
Figure 10:
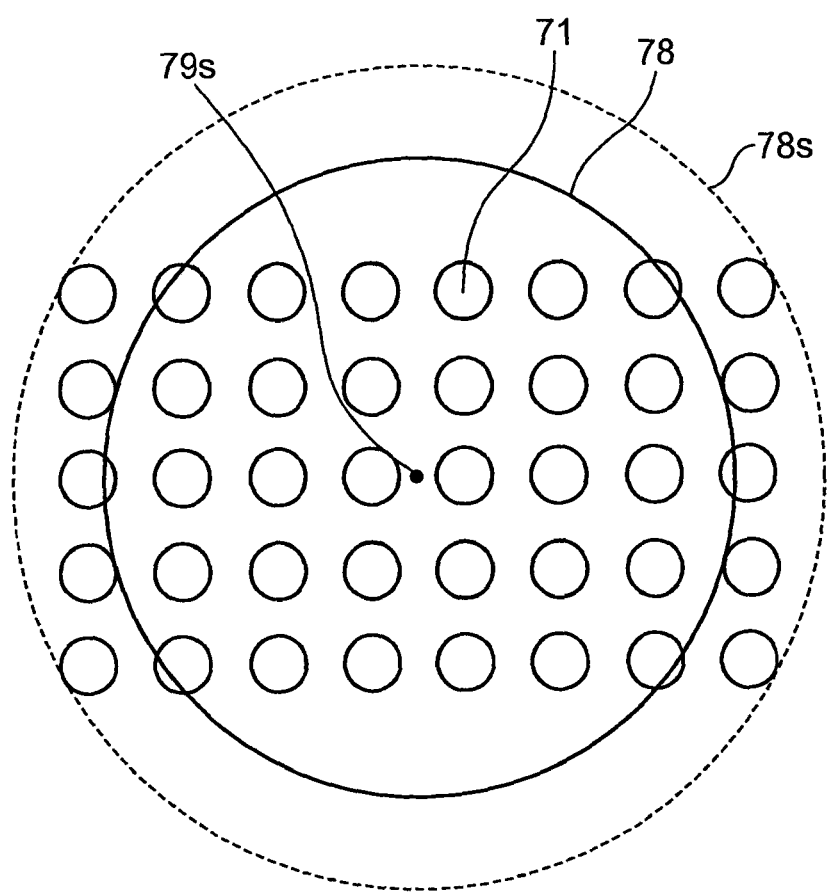
FIG. 10 illustrates an arrangement region of excitation light sources and the diameter of a condenser lens in the projector according to the embodiment.

As shown in FIG. 9A, the excitation-light-source-71-side end surface of each collimator lens 73 is a flat surface 73b and its excitation-light-emission-side end surface is a convex surface 73c. In a case that as shown in FIG. 9A the optical axis 73a of a collimator lens 73 coincides with the optical axis 71a of the associated excitation light source 71, as shown in FIG. 9B light emitted from the excitation light source 71 exits the collimator lens 73 straightly after passing through its flat surface 73b and curved surface 73c.

Figure 9C:
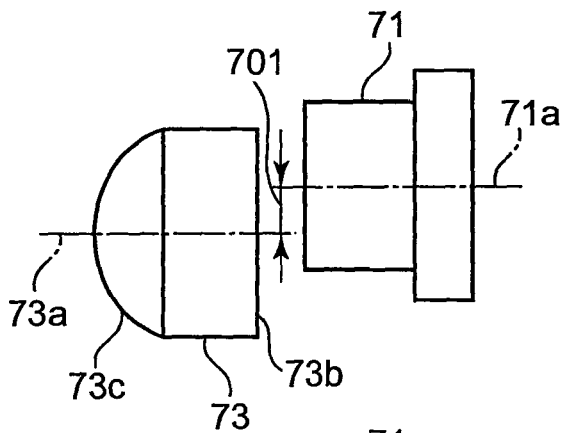
Figure 9D:
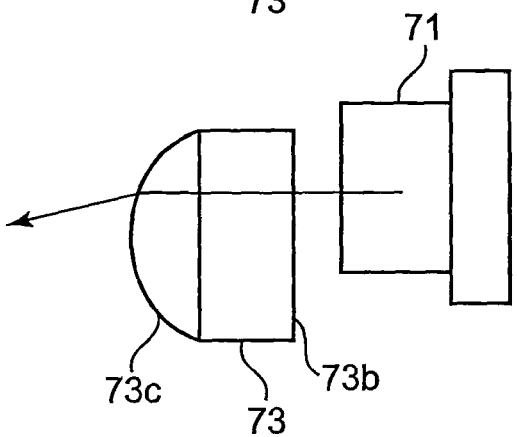

In a case that as shown in FIG. 9C the optical axis 73a of a collimator lens 73 is shifted from the optical axis 71a of the associated excitation light source 71, as shown in FIG. 9D laser light emitted from the excitation light source 71 perpendicularly shines on the flat surface 73b of the collimator lens 73 and refracted by its curved surface 73c toward the side to which the optical axis 73a of the collimator lens 73 is shifted from the optical axis 71a of the excitation light source 71. As a result, the light exits the collimator lens 73 obliquely with respect to its optical axis 73a.

The angle by which light emitted from each excitation light source 71 is refracted by the associated collimator lens 73 is determined by the shift length 701 of the optical axis 73a of the collimator lens 73 from the optical axis 71a of the excitation light source 71. In the embodiment, each collimator lens 73 is configured so that the refraction angle increases as the shift length 701 increases. Configured in such a manner that the excitation-light-source-71-side end surface is the flat surface 73b, the excitation-light-emission-side end surface is the convex surface 73c, and light is refracted once by only the curved surface 73c, the collimator lenses 73 can be designed easily and manufactured at a low cost.

The excitation light illumination device 70 is configured in such a manner that the shift length 701 increases and the collimator lens 73 becomes closer to the center 79s from the position where it coextends with the associated excitation light source 71 as the distance between the excitation light source 71 and the center 79s of the region where the excitation light sources 71 are arranged two-dimensionally increases.

The shift lengths 701 are determined properly according to the refractive index of the material of the collimator lenses 73, their focal length and shape, and other factors.

Figure 11:
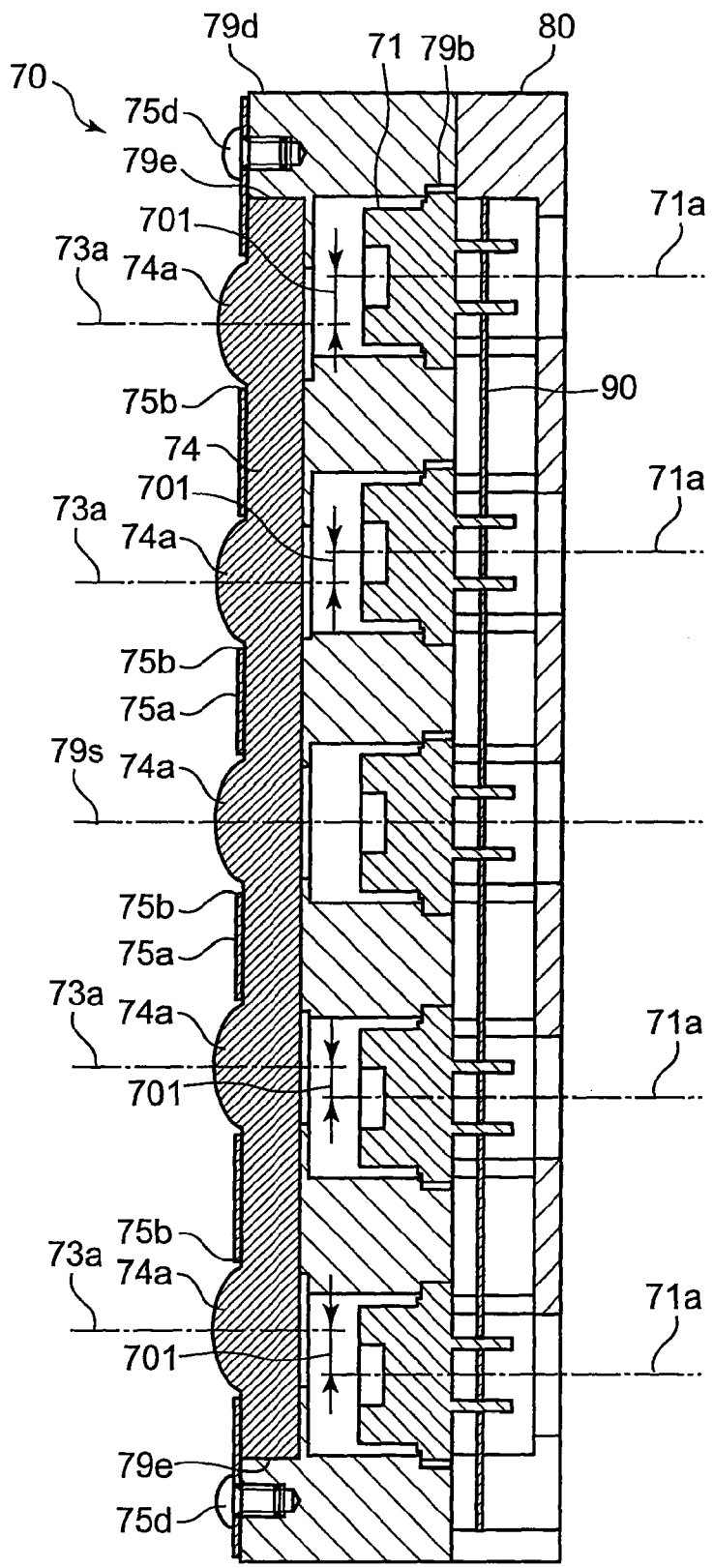
FIG. 11 is a sectional view of an excitation light illumination device using a collimator lens array.

Although the embodiment employs the separate collimator lenses 73, as shown in FIG. 11 they may be integrated into a single body using a mold glass material, in which case the excitation light illumination device 70 can be manufactured at a low cost.

More specifically, FIG. 11 is a sectional view of an excitation light illumination device 70 using a collimator lens array 74 which is a unified body of the above-described collimator lenses 73. A lens holder 79d is formed with a recess 79e for holding the collimator lens array 74. The collimator lens array 74 is put in the recess 79e and pressed by a plate-like pressing plate 75a so as to be held by the lens holder 79d. Openings 75b are formed through the pressing plate 75a at such positions as to expose respective collimator portions 74a, and the pressing plate 75a are fixed to the lens holder 79d with screws 75d.

As described above, the excitation light illumination device 70 of the projector 10 according to the embodiment of the invention can be configured so that the certain region 105, to be illuminated with excitation light beams, of the phosphor layer 104 of the phosphor wheel 101 is given a prescribed shape or a light intensity distribution by properly setting the shift lengths 701 of the optical axes 73a of the collimator lenses 73 from the optical axes 71a of the excitation light sources 71, respectively.

Figure 12:
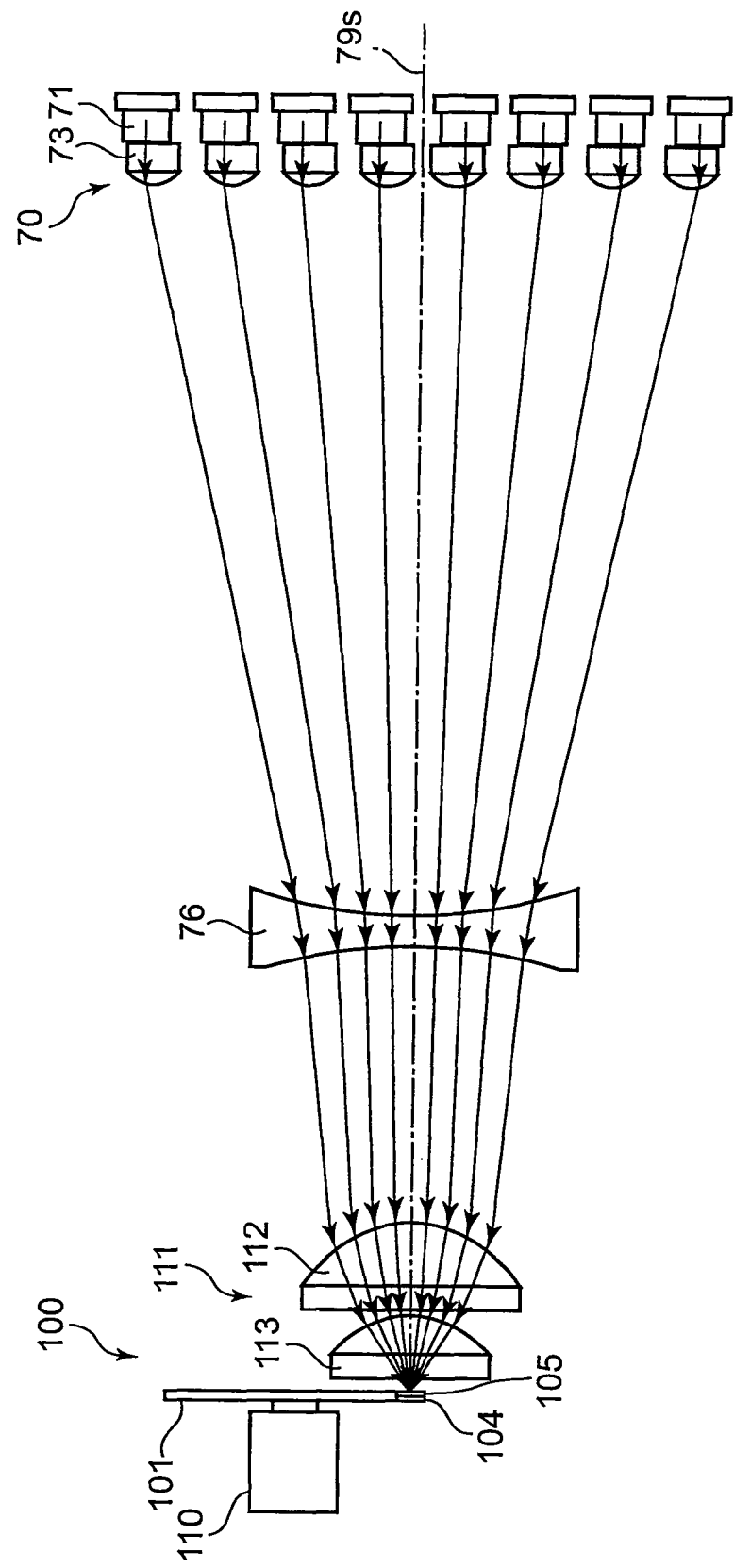
FIG. 12 is a schematic plan view showing optical paths of light beams emitted from the excitation light illumination device in a modification of the embodiment of the invention.

Although in the projector 10 according to the embodiment the condenser lens 78 is disposed between the collimator lenses 73 and the concave lens 76, the invention is not limited to such a case. FIG. 12 is a schematic plan view showing optical paths of light beams emitted from the excitation light illumination device 70 in a modification of the embodiment of the invention. As shown in FIG. 12, light beams emitted from the excitation light sources 71 and refracted by the collimator lenses 73 may be applied to the phosphor layer 104 of the phosphor wheel 101 via the concave lens 76 and the condenser lens group 111 without using the condenser lens 78 by properly setting the shift lengths 701 of the optical axes 73a of the collimator lenses 73 from the optical axes 71a of the excitation light sources 71, respectively.

According to the embodiment of the invention, as described above, a high-luminance projector 10 having a simpler structure can be provided at a relatively lower cost than in the comparative example in which the large-diameter condenser lens 78s is used (see FIG. 10).

As described above, in the embodiments, the excitation light illumination device 70 is equipped with the plural excitation light sources 71 arranged in a plane, the plural collimator lenses 73 which are disposed in the vicinities of the respective excitation light sources 71 and collimate light beams emitted from the excitation light sources 71, respectively, and the lens holder 79 and the light source holder 80 which hold the excitation light sources 71 and the collimator lenses 73. Light beams emitted from the excitation light sources 71 and refracted by the collimator lenses 73 are focused on the phosphor layer 104 ("illumination subject body"). The lens holder 79 and the light source holder 80 hold the excitation light sources 71 and the collimator lenses 73 so that the optical axes 73a of the collimator lenses 73 are shifted in a parallel manner from the optical axes 71a of the excitation light sources 71. The shift lengths 701 of the optical axes 73a of the collimator lenses 73 from the optical axes 71a of the excitation light sources 71 are set so that light beams emitted from the excitation light sources 71 and refracted by the collimator lenses 73 are focused on the certain region 105 of the phosphor layer 104. The light beams emitted from the excitation light sources 71 are refracted by the collimator lenses 73 and focused on the certain region 105 of the phosphor layer 104. As a result, a high-luminance light source device (excitation light illumination device 70) which is simple in structure and low in manufacturing cost as well as a projector 10 having such a light source device can be provided.

Light beams emitted from the excitation light sources 71 and refracted by the collimator lenses 73 are not parallel with each other and their intervals decrease as they travel. This makes it possible to construct the projector 10 using the condenser lens 78 having a relatively small diameter or even without using the condenser lens 78.

In the embodiments, the lens holder 79 and the light source holder 80 ("holder") hold the excitation light sources 71 and the collimator lenses 73 which correspond to the respective excitation light sources 71 so that the excitation light sources 71 as well as the collimator lenses 73 are arranged in rows and columns in a plane. And the shift length 701 of each collimator lens 73 from the associated excitation light source 71 is set according to the distance between the collimator lens 73 and the center 79s of the region where the excitation light sources 71 are arranged in a plane in the lens holder 79 and the light source holder 80. As a result, a high-luminance light source device (excitation light illumination device 70) which is simple in structure and low in manufacturing cost as well as a projector 10 having such a light source device can be provided.

In the embodiments, the shift length 701 of the collimator lens 73 is increased as the distance between the associated excitation light source 71 and the center 79s of the region where the excitation light sources 71 are arranged in a plane in the lens holder 79 and the light source holder 80 increases. As a result, a high-luminance light source device (excitation light illumination device 70) which is simple in structure and low in manufacturing cost as well as a projector 10 having such a light source device can be provided.

In the embodiments, the light-source-side end surface of each collimator lens 73 is a flat surface and its excitation-light-emission-side end surface is a convex surface. And the angle by which light emitted from each excitation light source 71 is refracted by the associated collimator lens 73 is determined by the shift length 701 of the collimator lens 73 from the excitation light source 71. The use of the collimator lenses 73 each having such a structure makes it possible to provide a high-luminance light source device (excitation light illumination device 70) which is simple in structure and low in manufacturing cost, as well as a projector 10 having such a light source device.

In the embodiments, the lens holder 79 has the holes 79b (light source holding holes) which hold the respective excitation light sources 71 so that they are arranged at regular intervals and in rows and columns in a plane and that their optical axes 71a are parallel with each other and holes 79a (lens holding holes) which hold the respective collimator lenses 73 corresponding to the respective excitation light sources 71 so that their optical axes 73a are parallel with each other and shifted by the shift lengths 701. As a result, a high-luminance light source device (excitation light illumination device 70) which is simple in structure and low in manufacturing cost as well as a projector 10 having such a light source device can be provided.

In the embodiments, the shift lengths 701 of the collimator lenses 73 from the excitation light sources 71 are set so that the certain region 105, that is, a light intensity distribution having a certain width, is formed on the phosphor layer 104 ("illumination subject body"). By properly setting the shift lengths 701, a high-luminance light source device (excitation light illumination device 70) which makes it possible to form the certain region 105, that is, a light intensity distribution having a certain width, on the phosphor layer 104 as well as a projector 10 having such a light source device can be provided easily. More specifically, whereas light beams emitted from the many excitation light sources 71 are allowed to shine on a phosphor surface, the illumination intensity can be suppressed so as to be lower than a limit value (upper limit value). Where the illumination intensity is lower than the upper limit value, the intensity of emitted fluorescent light increases as the illumination intensity increases. Where the illumination intensity is equal to the upper limit value, the intensity of emitted fluorescent light is saturated. Where the illumination intensity is very high, the temperature of the phosphor layer 104 becomes too high and the intensity of emitted fluorescent light is reduced. It is therefore preferable that to prevent saturation of the intensity of emitted fluorescent light the intensity of illumination of the phosphor layer 104 be set lower than the upper limit value.

In the embodiments, laser light sources are used as the excitation light sources 71, which makes it possible to provide a high-luminance light source device (excitation light illumination device 70) which is simple in structure, as well as a projector 10 having such a light source device.

In the embodiments, the projector 10 is equipped with the red light source device 120 for emitting light in a red wavelength range, the excitation light illumination device 70 and the fluorescent light emitting device 100 ("green light source device") for emitting light in a green wavelength range, the blue light source device 300 for emitting light in a blue wavelength range, the guiding optical system 140 for causing the light in the red wavelength range, the light in the green wavelength range, and the light in the blue wavelength range to travel along the same optical axis, the display element 51, the light-source-side optical system 170 for guiding the light beams having the same optical axis to the display element 51, the projection-side optical system 220 for projecting an optical image formed by the display device 51 onto a screen, and the controller 38 (part of the projector controller) for controlling the light source devices and the display element 51. The fluorescent light emitting device 100 (part of the green light source device) has the phosphor wheel 101 (phosphor plate). The excitation light illumination device 70 is equipped with the excitation light sources 71 and the collimator lenses 73, and the excitation light sources 71 emit excitation light beams. As a result, a high-luminance light source device (excitation light illumination device 70) which is simple in structure and low in manufacturing cost as well as a projector 10 having such a light source device can be provided.

In the embodiments, the concave lens 76, the first dichroic mirror 141, and the condenser lens group 111 are disposed in this order between the collimator lenses 73 and the phosphor layer 104 of the phosphor wheel 101. The concave lens 76 converts excitation light beams emitted from the excitation light sources 71 and refracted by the collimator lenses 73 into generally parallel light beams. The condenser lens group 111 condenses excitation light beams refracted by the concave lens 76 and transmitted by the first dichroic mirror 141 on the phosphor layer 104 of the phosphor wheel 101 and focuses fluorescent light emitted from the phosphor layer 104. The first dichroic mirror 141 which is disposed obliquely with respect to the optical axis of the concave lens 76 and the condenser lens group 111 transmits excitation light beams that are output from the concave lens 76 and reflects fluorescent light condensed by the condenser lens group 111. As a result, a high-luminance light source device (excitation light illumination device 70) which is simple in structure and low in manufacturing cost as well as a projector 10 having such a light source device can be provided. More specifically, since the concave lens 76 causes excitation light beams pass through the first dichroic mirror 141 in a state that they are as close to parallel light beams as possible, the degree of undesirable reflection of those excitation light beams can be lowered.

In the embodiments, the condenser lens 78 is disposed between the excitation light source 71 which emit excitation light beams and the concave lens 76. Therefore, the distance between the excitation light illumination device 70 and the phosphor wheel 101 is shorter than in a configuration without the condenser lens 78. As a result, a relatively small projector 10 can be provided.

In the embodiments, since the certain region 105, to be illuminated with excitation light beams, of the phosphor layer 104 can be made rectangular, the display element 51 such as a rectangular DMD can be illuminated with light having an approximately uniform intensity distribution. As a result, a projector 10 which provides a luminance distribution that is low in unevenness can be provided.

In the projector 10 according to the embodiment, the concave lens 76, the first dichroic mirror 141, and the condenser lens group 111 are disposed in this order between the excitation light illumination device 70 and the phosphor layer 104. When excitation light beams emitted from the excitation light sources 71 shine on the phosphor layer 104 of the phosphor wheel 101, fluorescent light is emitted from the phosphor layer 104 to the side of the excitation light illumination device 70 and fluorescent light condensed by the condenser lens group 111 is reflected by the first dichroic mirror 141. However, the invention is not limited to this configuration. For example, a configuration is possible that does not employ the concave lens 76, the first dichroic mirror 141, and the condenser lens group 111. When excitation light beams emitted from the excitation light sources 71 of the excitation light illumination device 70 shine on the phosphor layer 104 of the phosphor wheel 101, fluorescent light is emitted from the phosphor layer 104 to the side opposite to the excitation light illumination device 70. Because of the omission of the concave lens 76, the first dichroic mirror 141, and the condenser lens group 111, a projector 10 can be provided which is simple in configuration and small in size.

Although in the embodiment the excitation light sources 71 are arranged at regular intervals and the collimator lenses are shifted from the respective excitation light sources 71, the invention is not limited to such a case. For example, a configuration is possible in which the collimator lenses 73 are arranged at regular intervals and the excitation light source 71 are shifted from the respective collimator lenses 73.

Another configuration is possible in which only part of the collimator lenses 73 are shifted.

The present invention is not limited to the specific embodiments described above and the present invention can be modified without departing from the spirit and scope of the present invention. Further, functions performed in the above-described embodiments can be properly combined to the utmost possible. In the above-described embodiments, various phases are included and various inventions can be derived according to appropriate combinations of disclosed plural components. For example, if some effects can be achieved, some components may be deleted from the configurations as described as the embodiments and the configuration with some components deleted can be derived as the invention.

What is claimed is:

1. A light source device comprising:
   plural light sources arranged in a plane;
   plural collimator lenses each of which is disposed in a vicinity of a corresponding one of the light sources, each of the collimator lenses collimating a light beam emitted from the corresponding light source; and
   a holder that holds the light sources and the collimator lenses,
   wherein the holder holds the light sources and the collimator lenses so that optical axes of the collimator lenses are respectively shifted parallel to optical axes of the light sources by shift lengths that are set so that light beams emitted from the light sources via the collimator lenses are focused on a certain region of an illumination subject body,
   wherein the light beams emitted from the light sources are refracted by the collimator lenses and focused on the certain region, and
   wherein the holder holds the light sources and the collimator lenses such that the light sources are arranged in rows and columns in a plane and the collimator lenses are arranged in rows and columns in a plane, and such that the shift length of each collimator lens with respect to the corresponding light source is set according to a distance between the corresponding light source and a center of a region where the light sources are arranged in a plane in the holder.

2. The light source device according to claim 1, wherein the shift length increases as the distance between the corresponding light source and the center of the region increases.

3. The light source device according to claim 1, wherein the light sources comprise laser light sources.

4. A projector comprising:
   a red light source device;
   a green light source device;
   a blue light source device;
   a guiding optical system that causes light beams emitted from each of the red light source device, the green light source device, and the blue light source device to travel along a same optical axis;
   a display element;
   a light-source-side optical system that guides the light beams having the same optical axis to the display element;
   a projection-side optical system that projects an optical image formed by the display device onto a screen; and
   a projector controller that controls the light source devices and the display element,
   wherein at least one of the red light source device, the green light source device, and the blue light source device comprises the light source device according to claim 1,
   wherein the light source device comprises a phosphor plate and light sources that emit excitation light beams, and
   wherein the excitation light beams are emitted via the collimator lenses to the phosphor plate.

5. The projector according to claim 4, further comprising:
   a concave lens;
   a dichroic mirror; and
   a condenser lens group,
   wherein the concave lens, the dichroic mirror, and the condenser lens group are disposed in this order between the collimator lenses and the phosphor plate,
   wherein the concave lens converts the excitation light beams emitted from the light sources via the collimator lenses into substantially parallel light beams,
   wherein the condenser lens group focuses excitation light beams transmitted from the concave lens via the dichroic mirror on a phosphor layer of the phosphor plate and focuses fluorescent light emitted from the phosphor layer, and
   wherein the dichroic mirror is disposed obliquely with respect to an optical axis of the concave lens and the condenser lens group, and transmits the excitation light beams that are output from the concave lens and reflects the fluorescent light focused by the condenser lens group.

6. The projector according to claim 5, further comprising a condenser lens disposed between the concave lens and the light sources that emit the excitation light beams.

7. A light source device comprising:
   plural light sources arranged in a plane;
   plural collimator lenses each of which is disposed in a vicinity of a corresponding one of the light sources, each of the collimator lenses collimating a light beam emitted from the corresponding light source; and
   a holder that holds the light sources and the collimator lenses,
   wherein the holder holds the light sources and the collimator lenses so that optical axes of the collimator lenses are respectively shifted parallel to optical axes of the light sources by shift lengths that are set so that light beams emitted from the light sources via the collimator lenses are focused on a certain region of an illumination subject body,
   wherein the light beams emitted from the light sources are refracted by the collimator lenses and focused on the certain region, and
   wherein the holder comprises: (i) plural light source holding holes that hold the light sources so that the light sources are arranged at regular intervals and in rows and columns in a plane and so that their optical axes are parallel with each other, and (ii) plural lens holding holes that hold the collimator lenses so that their optical axes are parallel with each other and shifted by the shift lengths.

8. The light source device according to claim 7, wherein the light sources comprise laser light sources.

9. A projector comprising:
   a red light source device;
   a green light source device;
   a blue light source device;
   a guiding optical system that causes light beams emitted from each of the red light source device, the green light source device, and the blue light source device to travel along the same optical axis;
   a display element;
   a light-source-side optical system that guides the light beams having the same optical axis to the display element;
   a projection-side optical system that projects an optical image formed by the display device onto a screen; and
   a projector controller that controls the light source devices and the display element,
   wherein at least one of the red light source device, the green light source device, and the blue light source device comprises the light source device according to claim 4,
   wherein the light source device comprises a phosphor plate and light sources that emit excitation light beams, and wherein the excitation light beams are emitted via the collimator lenses to the phosphor plate.

10. The projector according to claim 9, further comprising:
a concave lens;
a dichroic mirror; and
a condenser lens group,
wherein the concave lens, the dichroic mirror, and the condenser lens group are disposed in this order between the collimator lenses and the phosphor plate,
wherein the concave lens converts the excitation light beams emitted from the light sources via the collimator lenses into substantially parallel light beams,
wherein the condenser lens group focuses excitation light beams transmitted from the concave lens via the dichroic mirror on a phosphor layer of the phosphor plate and focuses fluorescent light emitted from the phosphor layer, and
wherein the dichroic mirror is disposed obliquely with respect to an optical axis of the concave lens and the condenser lens group, and transmits the excitation light beams that are output from the concave lens and reflects the fluorescent light focused by the condenser lens group.

11. The projector according to claim 10, further comprising a condenser lens disposed between the concave lens and the light sources that emit the excitation light beams.

12. A light source device comprising:
plural light sources arranged in a plane;
plural collimator lenses each of which is disposed in a vicinity of a corresponding one of the light sources, each of the collimator lenses collimating a light beam emitted from the corresponding light source; and
a holder that holds the light sources and the collimator lenses,
wherein the holder holds the light sources and the collimator lenses so that optical axes of the collimator lenses are respectively shifted parallel to optical axes of the light sources by shift lengths that are set so that light beams emitted from the light sources via the collimator lenses are focused on a certain region of an illumination subject body,
wherein the light beams emitted from the light sources are refracted by the collimator lenses and focused on the certain region, and
wherein the shift lengths are set so that a light intensity distribution having a certain width is formed on the illumination subject body.

13. The light source device according to claim 12, wherein the light sources comprise laser light sources.

14. A projector comprising:
a red light source device;
a green light source device;
a blue light source device;
a guiding optical system that causes light beams emitted from each of the red light source device, the green light source device, and the blue light source device to travel along the same optical axis;
a display element;
a light-source-side optical system that guides the light beams having the same optical axis to the display element;
a projection-side optical system that projects an optical image formed by the display device onto a screen; and
a projector controller that controls the light source devices and the display element,
wherein at least one of the red light source device, the green light source device, and the blue light source device comprises the light source device according to claim 5,
wherein the light source device comprises a phosphor plate and light sources that emit excitation light beams, and
wherein the excitation light beams are emitted via the collimator lenses to the phosphor plate.

15. The projector according to claim 14, further comprising:
a concave lens;
a dichroic mirror; and
a condenser lens group,
wherein the concave lens, the dichroic mirror, and the condenser lens group are disposed in this order between the collimator lenses and the phosphor plate,
wherein the concave lens converts the excitation light beams emitted from the light sources via the collimator lenses into substantially parallel light beams,
wherein the condenser lens group focuses excitation light beams transmitted from the concave lens via the dichroic mirror on a phosphor layer of the phosphor plate and focuses fluorescent light emitted from the phosphor layer, and
wherein the dichroic mirror is disposed obliquely with respect to an optical axis of the concave lens and the condenser lens group, and transmits the excitation light beams that are output from the concave lens and reflects the fluorescent light focused by the condenser lens group.

16. The projector according to claim 15, further comprising a condenser lens disposed between the concave lens and the light sources that emit the excitation light beams.

17. A projector comprising:
a red light source device;
a green light source device;
a blue light source device;
a guiding optical system that causes light beams emitted from each of the red light source device, the green light source device, and the blue light source device to travel along a same optical axis;
a display element;
a light-source-side optical system that guides the light beams having the same optical axis to the display element;
a projection-side optical system that projects an optical image formed by the display device onto a screen;
a concave lens;
a dichroic mirror;
a condenser lens group; and
a projector controller that controls the light source devices and the display element;
wherein at least one of the red light source device, the green light source device, and the blue light source device comprises:
plural light sources arranged in a plane;
plural collimator lenses each of which is disposed in a vicinity of a corresponding one of the light sources, each of the collimator lenses collimating a light beam emitted from the corresponding light source;
a holder that holds the light sources and the collimator lenses; and
a phosphor plate; and
wherein:
the light sources emit excitation light beams;
the holder holds the light sources and the collimator lenses so that optical axes of the collimator lenses are respectively shifted parallel to optical axes of the light sources by shift lengths that are set so that the excitation light beams emitted from the light sources are refracted by the collimator lenses and focused on a certain region of an illumination subject body;

the light beams emitted from the light sources are refracted by the collimator lenses and focused on the certain region;

the excitation light beams are emitted via the collimator lenses to the phosphor plate;

the concave lens, the dichroic mirror, and the condenser lens group are disposed in this order between the collimator lenses and the phosphor plate;

the concave lens converts the excitation light beams emitted from the light sources via the collimator lenses into substantially parallel light beams;

the condenser lens group focuses excitation light beams transmitted from the concave lens via the dichroic mirror on a phosphor layer of the phosphor plate and focuses fluorescent light emitted from the phosphor layer; and the dichroic mirror is disposed obliquely with respect to an optical axis of the concave lens and the condenser lens group, and transmits the excitation light beams that are output from the concave lens and reflects the fluorescent light focused by the condenser lens group.

18. The projector according to claim 17, further comprising a condenser lens disposed between the concave lens and the light sources that emit the excitation light beams.

\* \* \* \* \*

UNITED STATES PATENT AND TRADEMARK OFFICE
CERTIFICATE OF CORRECTION

PATENT NO. : 8,721,087 B2
APPLICATION NO. : 13/435982
DATED : May 13, 2014
INVENTOR(S) : Hideyuki Kurosaki Page 1 of 1

It is certified that error appears in the above-identified patent and that said Letters Patent is hereby corrected as shown below:

In the Claims

Column 16, Claim 9, Line 65, delete "claim 4" and insert --claim 7--

Column 18, Claim 14, Line 3, delete "claim 5" and insert --claim 12--.

Signed and Sealed this
Seventh Day of April, 2015

Michelle K. Lee
*Director of the United States Patent and Trademark Office*